United States Patent [19]

Hammond

[11] Patent Number: 4,652,319

[45] Date of Patent: Mar. 24, 1987

[54] METHOD OF CURING PATCHES ON CONTOURED SURFACES

[76] Inventor: Russell E. Hammond, 4120 Avati Dr., San Diego, Calif. 92117

[21] Appl. No.: 677,632

[22] Filed: Dec. 3, 1984

[51] Int. Cl.$^4$ ............................................. B32B 35/00
[52] U.S. Cl. ...................................... 156/94; 156/285; 156/382; 264/36; 264/101
[58] Field of Search ................. 156/94, 285, 286, 382; 264/36, 101, 102

[56] References Cited

U.S. PATENT DOCUMENTS

| | | | |
|---|---|---|---|
| 2,331,296 | 10/1943 | Bendix | 156/382 |
| 3,575,756 | 4/1971 | Maus | 156/382 X |
| 3,837,965 | 9/1974 | Mahon et al. | 156/94 X |
| 4,352,707 | 10/1982 | Wengler et al. | 156/94 X |
| 4,554,036 | 11/1985 | Newsom | 156/94 |

Primary Examiner—Robert A. Dawson
Attorney, Agent, or Firm—Robert F. Beers; Ervin F. Johnston; Harvey Fendelman

[57] ABSTRACT

A conformal oven which has flexible sidewalls for enabling it to conform to and seal against a contoured surface. A vacuum sealing bag is sealed over a patch on a contoured surface such as an airplane wing made of an epoxy composite material. A vacuum is created within a vacuum sealing bag over the patch and the oven is placed over the patch and is sealed against the contoured surface being patched. A partial vacuum is created within the oven to maintain the seal against the contoured surface. The atmosphere within the oven is heated by force convection of air, electric heating or other alternative heating means to cure the patch within the evacuated vacuum sealing bag.

The conformal oven is formed with flexible sidewalls, preferably accordian-like in shape, to enable the open end of the oven to conform to the contoured surface being patched and to enable sealing of the open end of the oven to the contoured surface in order to perform the curing process.

12 Claims, 15 Drawing Figures

Representative Epoxy Cure Cycle

METHOD OF CURING PATCHES ON CONTOURED SURFACES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of methods and apparatuses for curing damage repair patches. The invention is more specifically related to method and apparatuses for curing patches on contoured or curved surfaces. For example, new Navy aircraft such as the F/A-18 and the AV-8 are designed with increased amounts of epoxy composite materials on the aircraft surfaces. Techniques and devices for repairing damages that occur to such surfaces have become longstanding problems. Present field repair procedures for localized damage of epoxy composite materials involve the application of a patch that is vacuum, heat cured by a small rubberized heat blanket. There are inherent limitations with this approach. The major limitations are difficulty in maintaining a uniform temperature when curing patches over aircraft structural members and difficulty in creating and maintaining a vacuum and heating a patch over cured aircraft surfaces.

Figure 1:
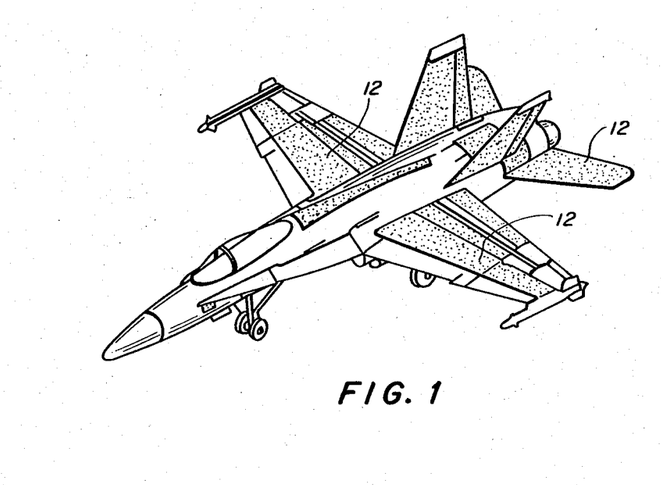
FIG. 1 is an isometric view of a Navy F/A-18 aircraft illustrating the areas of utilization of composite material.
Figure 2:
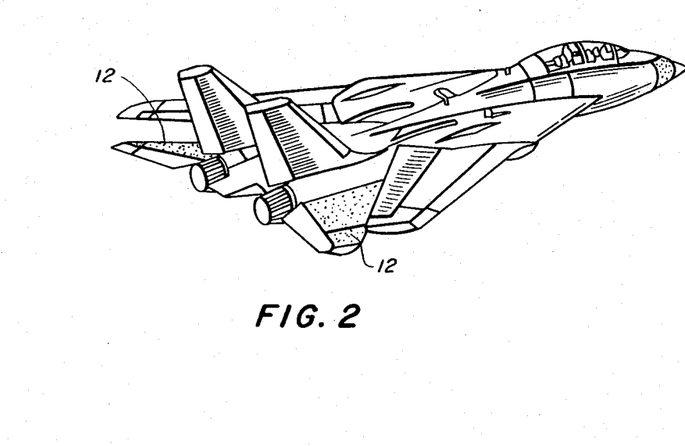
FIG. 2 is an isometric illustration of a Navy F-14 aircraft illustrating the areas of utilization of composite material.
Figure 3:
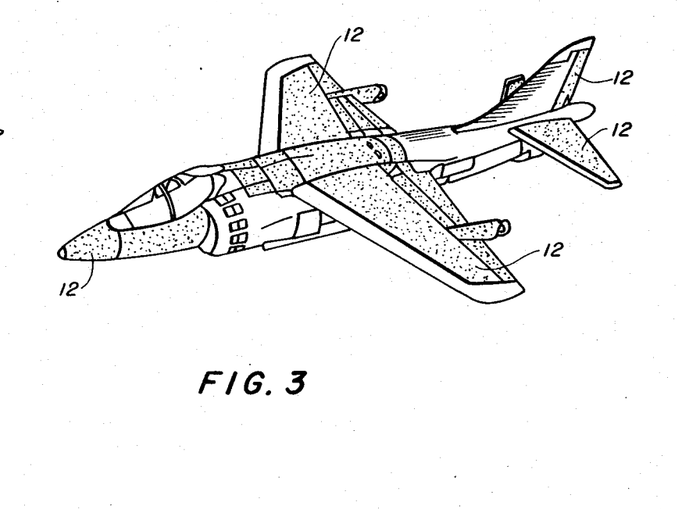
FIG. 3 is an isometric view of a Navy AV-8B aircraft illustrating the areas of utilization of composite material.
Figure 4:
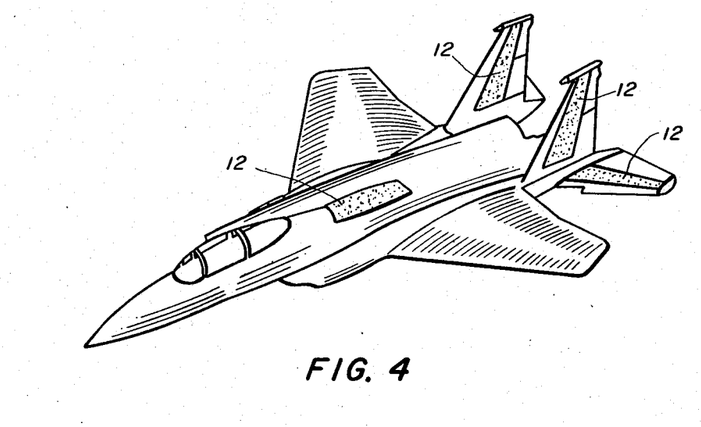
FIG. 4 is an isometric view of a Navy F-15 aircraft illustrating the areas of utilization of composite material.

The use of composite materials such as epoxy composites employed in military aircraft construction is increasing. Epoxy materials either in monolithic sheets or in bonded honeycomb make up approximately ten percent of the weight and forty percent of the surface area of the F/A-18 aircraft. FIGS. 1 through 4 are, respectively, illustrations of the Navy's F-18, F-14, AV-8B, and the F-15 aircraft. The stipled areas 12 indicated on those aircraft illustrations represent the areas where composite material is used in the construction of the respective aircraft. As can be seen in FIG. 1, for instance, the F/A-18 employs composite materials in much greater quantities than previously utilized. The F/A-18 utilizes composite materials on the inner wing, outer wing, vertical stabilizer, horizontal stabilizer, trailing edge flap, rudder, speedbrake, dorsal covers, landing gear strut doors, inboard and outboard landing gear wheel doors, avionics bay doors and miscellaneous access covers. It is noted that although the wing and stabilizer skins are bolted onto the aircraft, they are not removable and therefore repair of damage in these areas must be accomplished, in most cases, with the wing and stabilizer skins in place because special jigs are required for their replacement.

The capability to repair otherwise minor localized damage to the composite structures of aircraft is extremely important if the operational readiness of the aircraft is to be maintained. Since damage is inevitable during aircraft operation and during ground and hangar movement of the aircraft, repair capability is extremely important. The present repair procedures of epoxy composites briefly mentioned above requires the application of a patch. The patch may involve replacement of a honeycomb core material, the use of preimpregnated fiber, foam, thin sheets of titanium or graphite and adhesive. The patch also requires application of heat and vacuum to ensure bonding of the materials.

There are further problems in repairing composite areas on aircraft. Areas such as the vertical stabilizers have underlying aluminum ribs and spars which act as heat sinks during the application of heat in the patching process. The effect of these heat sinks is to diminish the efficiency of the patching process.

Figure 5:
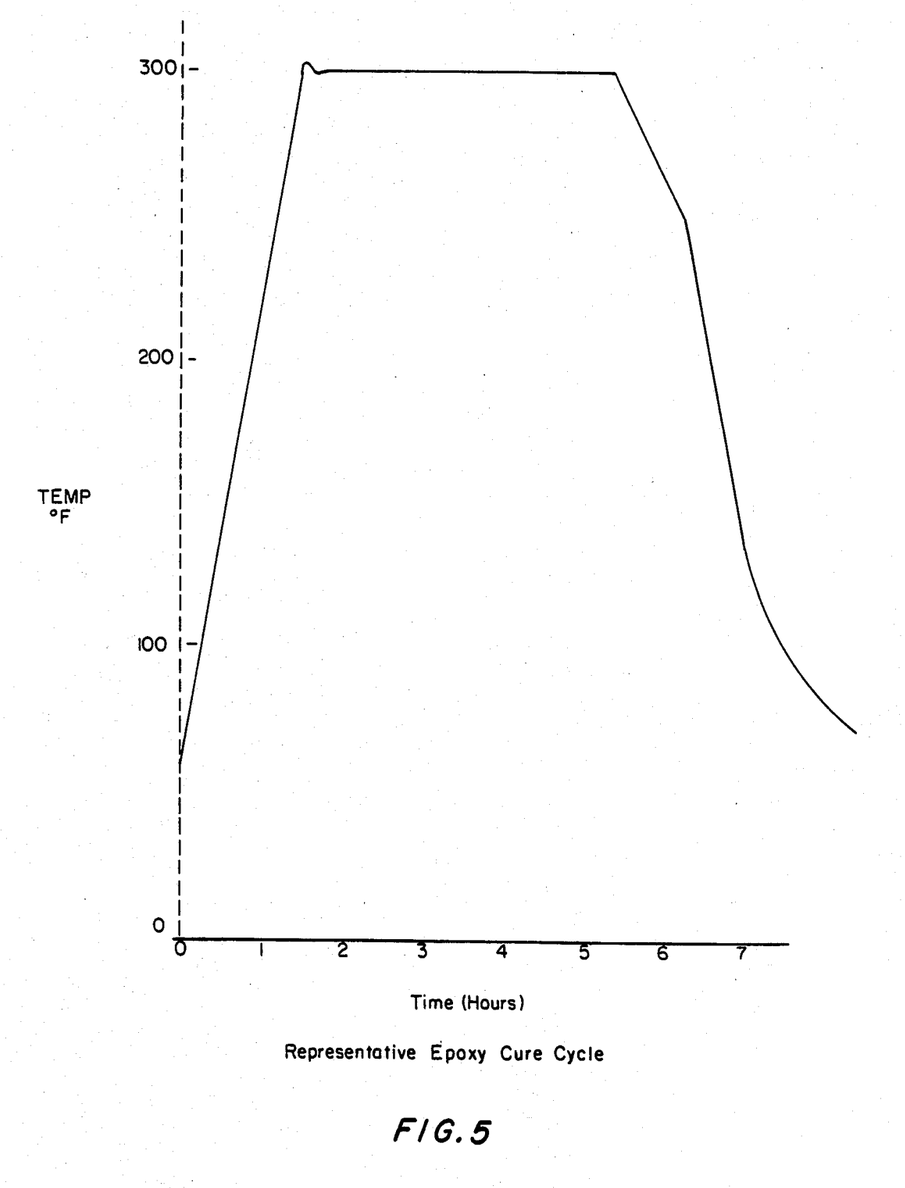
FIG. 5 is a graph illustrating in terms of temperature versus time the temperature profile for accomplishing a satisfactory epoxy cure.

FIG. 5 is an illustration of a basic temperature profile for a satisfactory epoxy cure plotted in terms of temperature versus time. The profile shown is for a particular graphite epoxy but the general requirements of a controlled temperature rise, a set temperature maintained for a fixed period of time, and a controlled temperature drop during cool-down are similar for different types of epoxy and are, therefore, generally represented by the graph of FIG. 5. The controlled temperature rise in the range of 3° F./min to 5° F./min maximum is necessary to ensure that the volatiles in the epoxy are driven off uniformly and that voids do not form. Voids leave the epoxy mixture structurally deficient. Also with the addition of a catalyst to the epoxy, an exothermic reaction takes places with heat generation. A rapid temperature rise coupled with the exothermic heat may mean that the epoxy mixture's temperature may rise to as high as 500° F. again creating structural deficiencies. After the controlled temperature rise takes place, a set temperature mut be uniformly maintained for a period of time. It is during this time that the epoxy cures, and its molecular matrix structure becomes intertwined and substantial structural strength achieved. The maximum temperature and its duration are variable. Higher temperatures cause curing of mixtures in a shorter time. However, tempering of underlying structural aluminum may be a consideration of higher tempertures. A representative set temperature and duration is 300° F. for four hours. During this curing time the temperature must be maintained within $\pm 10°$ F. or in some cases $\pm 20°$ F. to ensure adequate shear strength. Finally, a cool-down rate must be maintained. If the temperature is allowed to drop too rapidly, the result is that microcracks will form. Microcracks allow the absorption of moisture which causes swelling, lowering of the transition temperature, and degradation of the compressive strength at elevated temperatures. Current literature suggests that if the cool-down rate is limited to 1° F./min, the formation of microcracks is insignificant.

Figure 6:
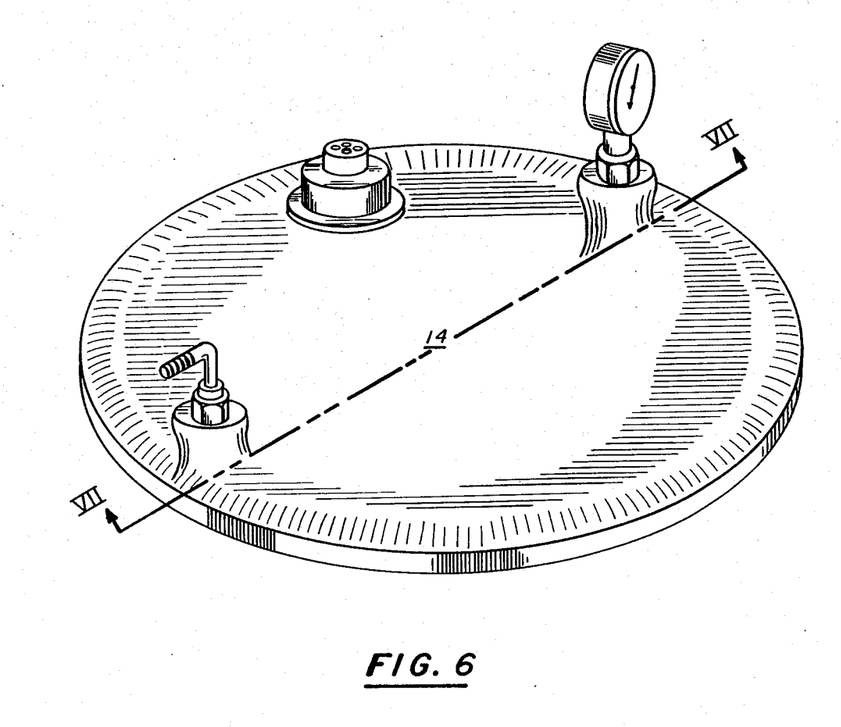
FIG. 6 is an isometric view of a prior art heating blanket.
Figure 7:
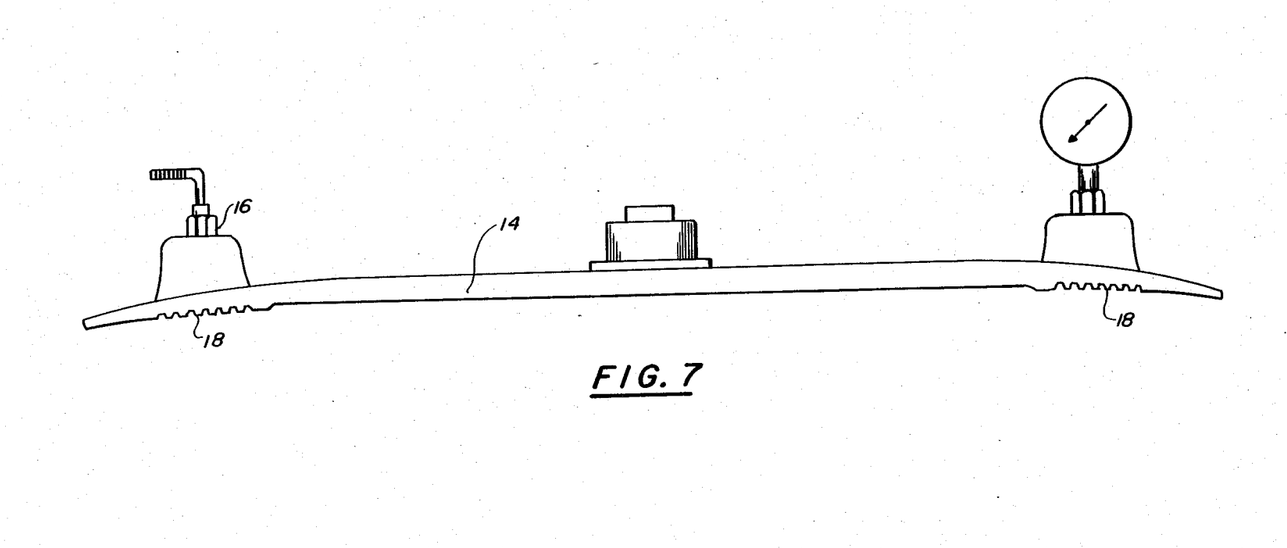
FIG. 7 is a cross-section of the heating blanket of FIG. 6 taken along lines VII—VII of FIG. 6.

There are several heat blankets and heat blanket controllers presently on the market for utilization in patch curing as described above. They, however, have significant deficiencies which limit their use. For instance, Grumman Aerospace Corp. has developed a heat blanket/controller system suitable for some repairs of F-14's FIG. 6 is an isometric view of the Grumman Aerospace Corp. heat blanket 14 and FIG. 7 is a cross-section taken along lines VII—VII of FIG. 6 of the Grumman Aerospace Corp. heat blanket. Vaccuum hose attachment 16 is utilized to create a vacuum under the blanket 14 which seals by means of outer rubber ribs 18. The system includes a single heating element and a thermocouple system. This blanket design has the advantage of being simple and rugged and may work acceptably well in small plane or homogeneous repairs. However, it will not work on curved surfaces or areas where there are structural members below the surface which act as heat sinks.

SUMMARY OF THE INVENTION

The present invention is believed to solve the foregoing problems by providing a method and apparatus for curing patches on contoured surfaces.

In accordance with the present invention, the patch materials are constructed and put in place according to known techniques. A clear plastic vacuum sealing bag is then employed. The bag is sealed to the surface under repair with sealing putty and a vacuum line is attached to the bag. A vacuum of around 14 psi is enforced in the area over the patch sealed by the vacuum bag. The conformal oven of the present invention is then placed over the sealed patch. The oven is physically constructed with flexible accordian-like sides which allow sealing over aircraft contoured surfaces. A minimum vacuum may be enforced within the oven's atmosphere to create a suction to hold the oven to the contoured surface. This technique allows the conformal oven of the present invention to be applied to the undeside of wing surfaces and fuselages. The differential between the partial vacuum within the oven's atmosphere and the partial vacuum within the atmosphere contained within the clear plastic vacuum sealing bag exerts a net pressure on the patch. Heated air circulates within the oven to cure the patch from the inlet ports of the oven to the outlet ports of the oven. A thermocouple is utilized to sense the air temperature with the oven and to send the temperature information to a controller.

The conformal oven of the present invention may be attached by the hot air lines, vacuum line and thermocouple wire to the controller. Within the controller may be the vacuum source for the two necessary vacuums, the heating element for the hot air, a fan to provide forced convection of the air, and the control logic for the air temperature control. Panel inputs to the controller may include temperature information on the epoxy's desired temperature curing profile such as temperature rise rate, set time, and temperature fall rate. Such inputs could be in the form of thumbwheel switches. Outputs of the control logic may include power control to the heating element, fan airflow rate, and warning systems. System malfunctions in the form of over-temperature, under-temperature, loss of vacuum, thermocouple disconnect and heating element failure may be sensed by suitable sensing means to provide an indication on the controller in the form of warning alarms and possible cure cycle abort actions.

The present invention will enable curing of epoxy composite patches and the like on curved aircraft surfaces and on other contoured surfaces. By utilizing flexible accordian like sides on the heating oven, a far greater range of curved surfaces can be patched than with prior art heat blankets. Whereas numerous specialized individual heating blankets would be required to cure patches on the same surfaces, a single, conformal convection oven in accordance with the present invention would accomplish that task. The present invention also has the advantage of exhibiting uniform heat distribution. The temperature of the hot gas in contact with the patch is essentially uniform by utilization of the techniques of the present invention. Thus, a far better job may be done in transferring heat to a patch in the repair area with underlying structural heat sinks. With heat blankets, the temperature is sensed and maintained at a particular point at the location of the thermocouple and the electrical power to an entire resistive heating element is controlled by that point. Temperature can then vary widely over the face of the heat blanket allowing uneven curing of a patch. This problem is minimized with the conformal convection oven approach of the present invention since the temperature of the convected hot air is uniform. The present invention has the further advantage of moisture removal capability. Field repair with epoxy composite patches must be able to tolerate high moisture environments. However, essentially all moisture must be removed prior to application for a satisfactory patch to be achieved. The circulating hot air of the conformal oven provides a direct means to accomplish this.

OBJECTS OF THE INVENTION

Accordingly, it is the primary object of the present invention to disclose a conformal oven that may be utilized to cure patches on contoured surfaces.

It is another object of the present invention to disclose a technique and apparatus for uniformly curing patches on contoured surfaces.

It is another object of the present invention to disclose a technique and apparatus for uniformly curing patches.

It is a concomitant object of the present invention to disclose a technique and apparatus for curing patches in a system that has inherent moisture removal capability.

A still further object of the present invention is to disclose a technique and apparatus for patch repair that readily lends itself to temperature rise rate control, set time control and temperature fall rate control.

These and other objects of the invention will become more readily apparent from the ensuing specification when taken together with the drawings.

DESCRIPTION OF THE PREFERRED EMBODIMENT

Figure 8:
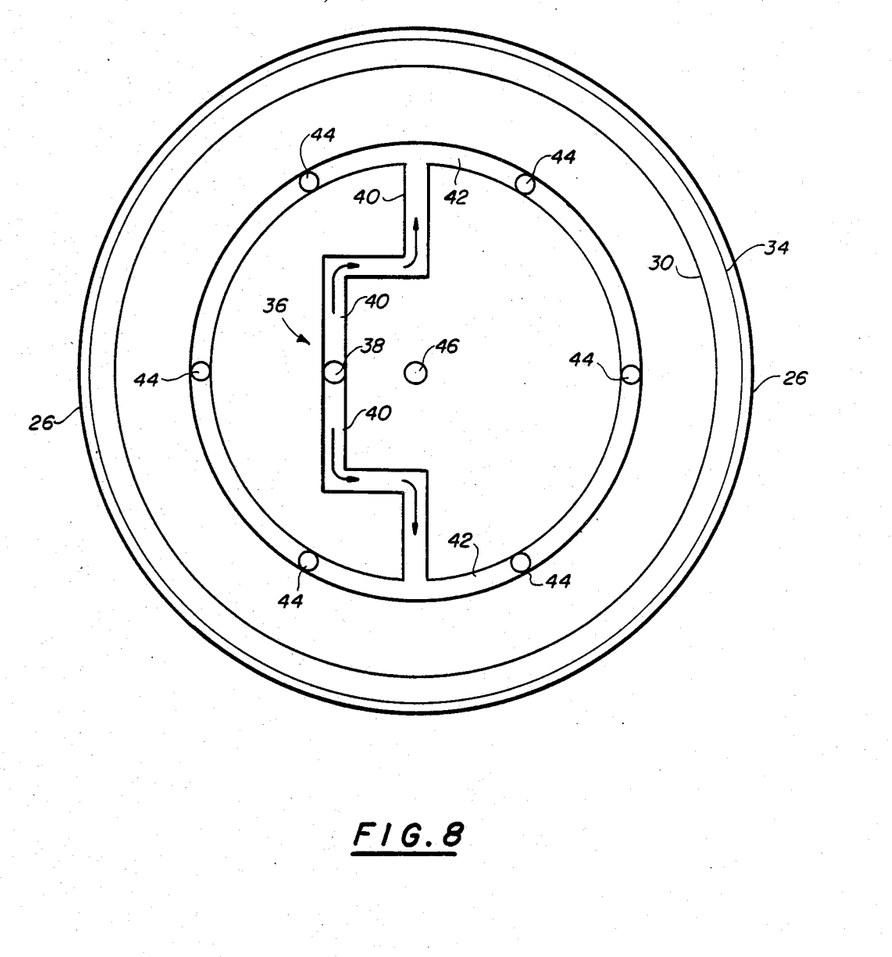
FIG. 8 is a top view of the conformal oven of the present invention.
Figure 9:
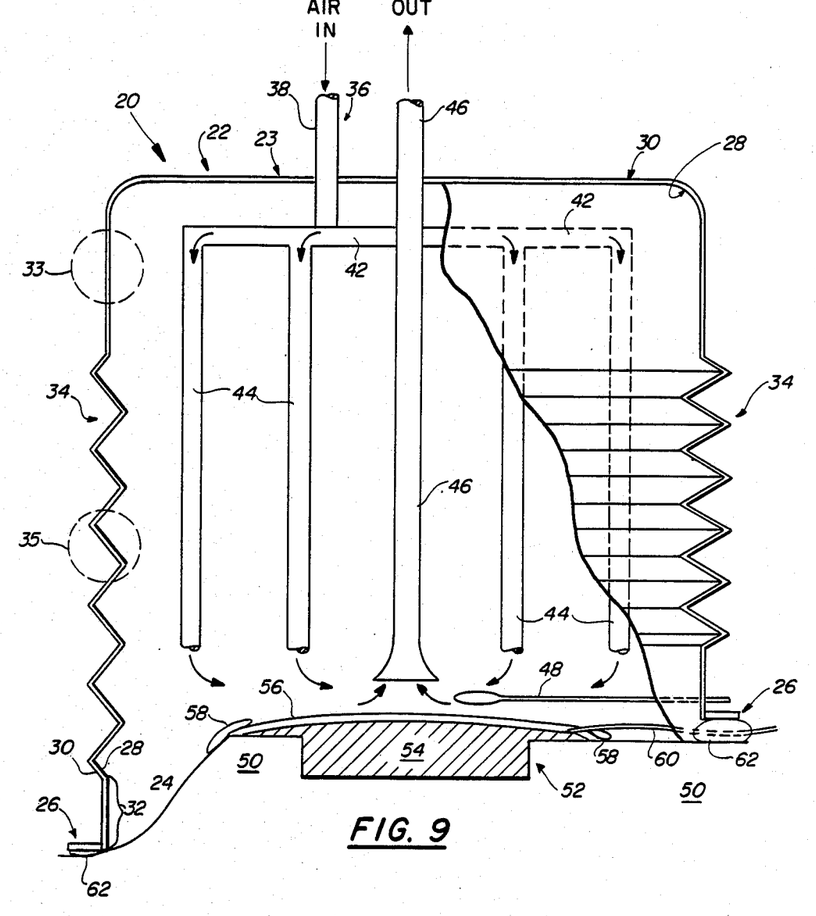
FIG. 9 is a partially cut away side view of the conformal oven of the present invention.
Figure 9A:
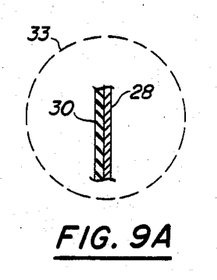
FIG. 9a is a cross section of a portion of the rigid sidewalls of the conformal oven of the present invention.

Referring now to FIGS. 8 and 9 the conformal oven of the present invention will be described. The conformal oven 20 of the present invention is comprised of a generally cup-shaped oven body 22. The ovenbody 22 has a closed top end 23 and an open bottom end 24. The body 22 of conformal oven 20 is terminated at the bottom end 24 in an annular lip or flange 26. The body 22 of the conformal oven 20 is preferably comprised of an aluminum core 28. The aluminum core 28 is coated on the exterior surface of the body 22 with a layer of silicone rubber 30. The cylindrical portion 32 of the conformal oven near the open bottom end 24 of the conformal oven 20 is also preferably formed of an aluminum core 28 having an exterior coating of silicone rubber. FIG. 9A is an enlarged view of the portion of the two-layer oven 20 wall illustrated within the dotted circle 33 shown in FIG. 9.

Figure 9B:
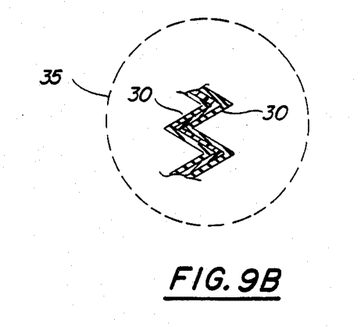
FIG. 9b is a cross section of a portion of the flexible sidewalls of the conformal oven of the present invention.

Above the cylindrical portion 32 of conformal oven 20, the conformal oven 20 has flexible, accordian-like cylindrical sidewalls 34. The cylindrical sidewalls 34 are preferably comprised of a three layer laminate of silicone-fiberglass-silicone. FIG. 9B is an enlarged view of the portion of flexible sidewalls 34 enclosed by the dotted circle 35 in FIG. 9.

In the preferred embodiment, the conformal oven 20 of the present invention is equipped with an intake air manifold 36. The intke air manifold 36 passes through the conformal oven top end 23 via a first down tube 38. The down tube 38 extends to coupling tube 40 which in turn couples at both of its ends to distributing pipe ring 42. The distributing pipe ring 42 in turn is coupled to six downtubes 44. An exhaust tube 46 extends through the center of the top 23 of the conformal oven 20 and extends down into the conformal oven, nearly to the open bottom end 24. As can be seen by the air flow arrows in FIGS. 8 and 9, heated air may be forced into the intake manifold 36 and will travel through down tube 38, connecting tube 40, coupling ring 42 and down through the six down tubes 44. The heated forced air then circulates within the space contained within the interior of the conformal oven 20 in order to heat and cure the patch as will be described below and then passes out of the oven via exhaust tube 46. Temperature sensing within the conformal oven 20 is provided by thermocouple 48 which extends into the interior cavity of the oven 20 and passes through an aperture in portion 32 of the sidewall of the oven 20 for connection to control power electronics to be described.

With reference again to FIG. 9, the process involved in curing a patch on a contoured surface will now be described. In FIG. 9, 50 represents a portion of a contoured surface such as the wing of an aircraft which requires repair. By way of example, an area 52 to be repaired is patched over with patch material 54 which is put in place according to known techniques. Preferably, the patch material 54 is an epoxy composite patch. a clear plastic vacuum sealing bag 56 is then placed over the patch 54 and is sealed against the surface of the wing 50 by sealing putty 58. A vacuum line 60 extends from the interior of sealing bag 58 as is illustrated. Preferably, a vacuum pressure of around 14 psi is enforced in the area over the patch 54 sealed by the vacuum bag 56 by means of the vacuum line 60. Next, the conformal oven 20 is placed over the patch 54 and over the sealing bag 56 as is illustrated in FIG. 9. The flange 26 of the conformal oven 20 is sealed against the contoured surface 50 by means of sealing putty 62 which is also utilized to provide a seal around the vacuum line 60. As can be seen in FIG. 9, the flexible, accordian-like sides 34 of the conformal oven 20 permit the sides of the conformal oven to extend where necessary in order for the bottom end 24 of the conformal oven to conform to and seal against the contoured surface to which the patch 54 is being applied. A minimal vacuum may be enforced in the air space within oven 20 in order to provide suction such that the oven 20 is secured to the surface that is being repaired. This vacuum within the atmosphere of oven 20 may be created by means of the intake pipe 36 and exhaust pipe 46 provided that the forced air convection heating mechanism to which the intake pipe 36 and exhaust pipe 46 are connected is a closed system. In order words, a vacuum may be maintained within the entire forced air convection heating system. By maintaining this minimal vacuum within the oven atmosphere, the oven can be applied to the underside of wing surfaces, fuselages, etc. The differential pressure between the minimal vacuum within the oven 20 atmosphere and the vacuum within the sealing bag 56 must be sufficient in order to exert a net pressure on the patch 54. Thus, heated air circulates from the inlet port 38 to the outlet port 46 within the oven and this heated air cures the patch 54 in a uniform, reliable manner.

Figure 13:
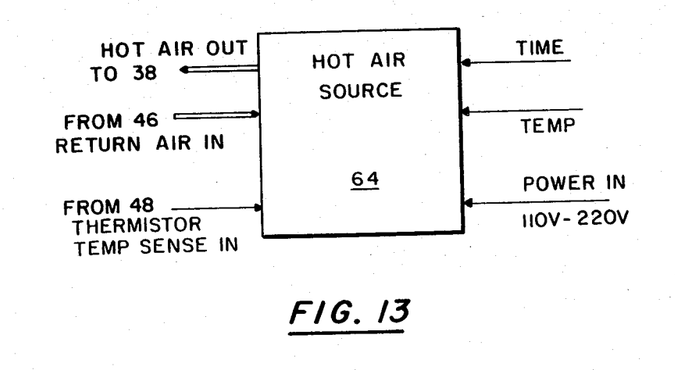
FIG. 13 is a block diagram of a hot air source suitable for use with the present invention.

As is depicted in FIG. 13, a hot air source 64 may be provided in order to furnish hot forced air to down tube 38 and to receive the exhaust hot air from exhaust tube 46. Further, the hot air source 64 may be provided with a thermistor temperature sensor input from thermistor type thermocouple 48 in order to monitor the internal temperature of the conformal oven 20. The hot air source 64 may also be provided with an input representative of the elapsed time of the curing process and a thermostatic type temperature control. By utilizing a hot air source such as hot air source 64 depicted in FIG. 13, the temperature rise rate, set time, and temperature fall rate of the curing process can be monitored and regulated.

Figure 10:
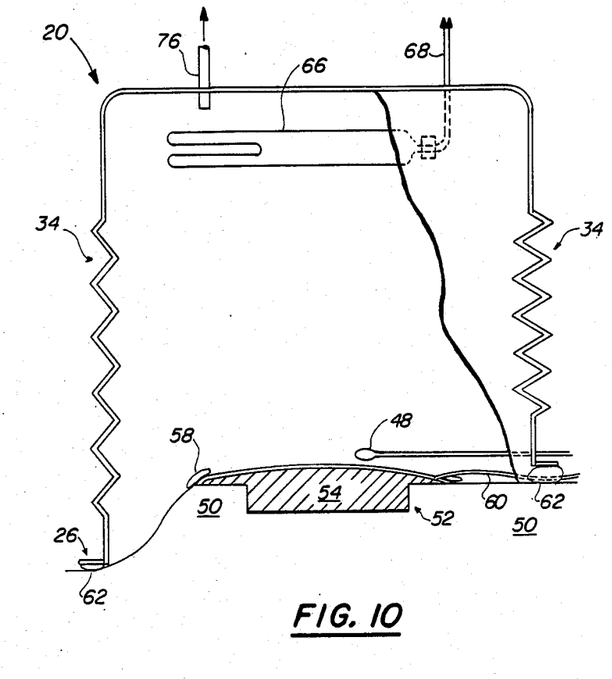
FIG. 10 is a partially cut away side view of an alternate embodiment of the conformal oven of the present invention.
Figure 11:
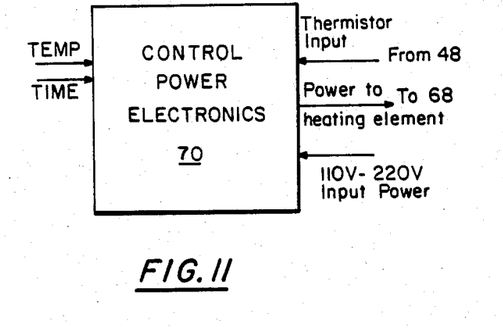
FIG. 11 is a block diagram of the control power electronics suitable for use with the present invention.
Figure 12:
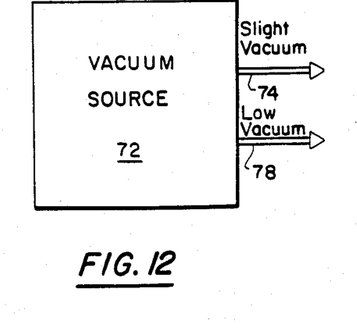
FIG. 12 is a block diagram of a vacuum source suitable for use with the present invention.

In an alternate embodiment of the present invention, the forced air convection heating system utilized in conjunction with the conformal oven 20 of the present invention may be replaced by an electric heating element system. Referring to FIG. 10, it is seen that the conformal oven 20 has been modified such that the intake and exhaust manifolds have been removed and an electric heating element 66 has been utilized in their place. The electric heating element 66 is connected via wires 68 to a control power electronics unit 70 depicted in FIG. 11. The control power electronics unit 70 is connected to the conformal oven 20 such that it receives a thermistor input from thermistor temperature sensing element 48. It is also equipped with thermostatic type temperature control inputs and an elapsed time input in order that this embodiment may also be utilized to control the temperature rise rate, set time and temperature fall rate of the curing process. In the embodiment of the present invention depicted in FIG. 10, vacuum source 72 would be required in order to generate the two vacuums utilized within the conformal oven 20.

More specifically, the vacuum source 72 may be utilized to generate a slight vacuum in the range of 1-2 psi within the atmosphere of the conformal oven 20 by connecting the slight vacuum output 74 of vacuum source 72 to a vacuum tube 76 which extends through the upper surface 23 of the conformal oven 20 as is seen in FIG. 10. A low vacuum in the neighborhood of 14 psi may be maintained on the low vacuum line 78 of vacuum source 72 and may be connected to the vacuum line 60 extending from the sealing bag 56. This vacuum source 72 may also be utilized to generate the low vacuum within sealing bag 56 in the embodiment of applicant's invention depicted in FIG. 9.

Obviously, many modifications and variations of the present invention are possible in the light of the above teachings. It is therefore to be understood that within the scope of the appended claims the invention may be practiced otherwise than as specifically described.

What is claimed is:

1. A method of repairing an area of contoured surface comprising the steps of:
   (a) placing a patch over said area of contoured surface;
   (b) placing a vacuum sealing bag having a vacuum line attached to it over said patch;
   (c) sealing said vacuum sealing bag to said contoured surface;
   (d) providing a conformal oven having a generally cup shaped body having an open bottom end for sealing against said contoured surface, said cup shaped body having substantially parallel flexible sidewalls for enabling said open bottom end to seal against said contoured surface and having an atmosphere containing cavity;
   (e) placing said open bottom end of said conformal oven over said patch and over said sealing bag;
   (f) adjusting said flexible side walls such that the entirety of said open bottom end abuts against said contoured surface;
   (g) sealing said open bottom end against said contoured surface;
   (h) creating a partial vacuum within said vacuum sealing bag via said vacuum line and;
   (i) heating the atmosphere within said conformal oven cavity so as to cure said patch.

2. The method of claim 1 wherein said step of sealing said vacuum sealing bag to said contoured surface comprises applying sealing putty to the juncture of said vacuum sealing bag and said contoured surface.

3. The method of claim 1 wherein said step of heating the atmosphere comprises providing forced convection of heated air into said conformal oven.

4. The method of claim 1 wherein said contoured surface comprises epoxy composite material and said patch comprises an epoxy composite patch.

5. The method of claim 1 wherein said step of sealing said open bottom end against said contoured surface comprises creating a partial vacuum within said conformal oven.

6. The method of claim 5 wherein the partial vacuum within said vacuum sealing bag is greater than the partial vacuum within said conformal oven.

7. The method of claim 1 wherein said flexible sidewalls comprise corrugated rubber.

8. The method of claim 1 wherein said flexible sidewalls comprise an accordion-like bellows structure.

9. The method of claim 1 wherein:
   said flexible sidewalls are comprised of a three layer laminated structure including a layer of fiberglass sandwiched between first and second layers of silicone.

10. The method of claim 9 wherein the remainder of said conformal oven is comprised of an aluminum core coated on its exterior surface with a layer of silicone rubber.

11. The method of claim 3 wherein said step of providing forced convection of heated air into said conformal oven includes the step of providing an intake manifold including at least one down tube through which heated air may be passed, said down tube having a distal end within the interior of said conformal oven and being positioned immediately adjacent to said vacuum sealing bag.

12. The method of claim 11 wherein:
   said step of providing forced convection of heated air into said conformal oven further comprises the step of providing an exhaust tube within the interior of said conformal oven, said exhaust tube having a distal end positioned within the interior of said conformal oven and further positioned immediately adjacent to said vacuum sealing bag.

* * * * *